United States Patent [19]

Hibiya et al.

[11] Patent Number: 4,522,473
[45] Date of Patent: Jun. 11, 1985

[54] FARADAY ROTATOR FOR AN OPTICAL DEVICE

[75] Inventors: Taketoshi Hibiya; Yoshinori Ohta; Koichi Matsumi, all of Tokyo, Japan

[73] Assignee: Nippon Electric Co., Ltd., Tokyo, Japan

[21] Appl. No.: 360,230

[22] Filed: Mar. 22, 1982

[30] Foreign Application Priority Data

Mar. 27, 1981 [JP] Japan .................................. 56-45195
Sep. 28, 1981 [JP] Japan .................................. 56-153253
Sep. 28, 1981 [JP] Japan .................................. 56-153254
Sep. 28, 1981 [JP] Japan .................................. 56-153255

[51] Int. Cl.³ ........................... G01B 9/02; G01P 9/00
[52] U.S. Cl. .................................. 350/377; 350/390; 356/350
[58] Field of Search ............... 350/377, 375, 376, 390; 356/350, 351

[56] References Cited

U.S. PATENT DOCUMENTS

4,222,668  9/1980  Henry .................................. 350/377

OTHER PUBLICATIONS

Besser et al., "Film/Substrate Matching Requirements for Bubble Domain Formation in CVD Garnet Films", *AIP Conference Proceedings*, No. 5, pp. 125–129, 1972.
W. T. Stacy, "Dislocations, Facet Regions and Growth Striations in Garnet Substrates and Layers", *Journal of Crystal Growth*, 24/25 (1974), pp. 137–143.

*Primary Examiner*—Bruce Y. Arnold
*Assistant Examiner*—William Propp
*Attorney, Agent, or Firm*—Laff, Whitesel, Conte & Saret

[57] ABSTRACT

A Faraday rotator has a non-magnetic garnet substrate with a ferrimagnetic garnet film epitaxially grown on the substrate. A magnet induces a magnetic field in the film for rotating the plane of polarization of a lightbeam which strikes an end surface of the film at a predetermined angle. The substrate and film are composed of a material wherein the difference ($\Delta a = a_s - a_f$) between the lattice constant $a_s$ of the substrate and the lattice constant $a_f$ of the film satisfies $|\Delta a| \leq 0.001$ Å (angstrom).

11 Claims, 9 Drawing Figures

FARADAY ROTATOR FOR AN OPTICAL DEVICE

The present invention relates to a Faraday rotator for use in optical devices such as an isolator or a switch operating in the visible and infrared regions of electromagnetic waves.

More and more reliable, inexpensive optical fiber transmission systems have been rapidly put into practical use. One of the problems yet to be solved to promote further practical use, of these systems however, lies in their instability in the oscillation of a laser oscillator placed on the transmitter side of a terminal or a repeater. More clearly, a light-beam emitted from the oscillator is reflected at the end surface of an optical connector on an optical fiber transmission line (or the repeater) and fed back to the oscillator, thereby causing an undesirable oscillation.

Conventionally, an optical isolator is used to prevent such a reflection as disclosed in the U.S. Pat. No. 3,944,329 (Reference 1). The patent isolator, which uses a Faraday rotator designed to rotate the plane of polarization of an incident light-beam, can achieve high isolation. Other examples of conventional optical devices, employing such a Faraday rotator, are an optical circulator for monitoring whether a transmission line has been cut off, in addition to an optical switch for the optical path alteration. For further details of those optical isolators and circulators outlined above, reference is made to a paper entitled "Optical Isolator and Circulator Using $Y_3Fe_5O_{12}$ Crystal for Optical Fiber Transmission" by H. Iwamura et al, published in Summaries of the 3rd International Conference on Ferrites held in Kyoto, Japan on Sept. 29–Oct. 2, 1980 (Reference 2). Also, for details of the above-mentioned optical switch, reference is made to a paper entitled "Bistable Optical Switch Using a Yitrium-Iron-Garnet Crystal with Phase Matching Films", by M. Shirasaki et al, appearing in Applied Physics Letters, Vol. 38, No. 11, pp. 833–834, published on June 1, 1981 (Reference 3). Each Faraday rotator used in the optical devices described in References 2 and 3 is costly because it requires a very expensive, bulk, yitrium-iron-garnet ($Y_3Fe_5O_{12}$) single crystal.

One object of the present invention is, therefore, to provide an inexpensive Faraday rotator capable of exhibiting high isolation and being free from the above-mentioned disadvantages of the conventional devices.

According to one aspect of this invention, a Faraday rotator comprises; a non-magnetic garnet substrate; a ferrimagnetic garnet film is epitaxially grown on the substrate, and a magnet induces a magnetic field in the film for rotating the plane of polarization of a light-beam impinging upon an end surface of the film, the rotation being a predetermined angle within the film. The substrate and film are composed of a material wherein the difference $\Delta a = a_s - a_f$ between the lattice constant $a_s$ of the substrate and the lattice constant $a_f$ of the film satisfies $$|\Delta a| \leq 0.001 \text{ Å (angstrom)}.$$

The present invention will be described in greater detail in conjunction with the accompanying drawings, in which.

Figure 1:
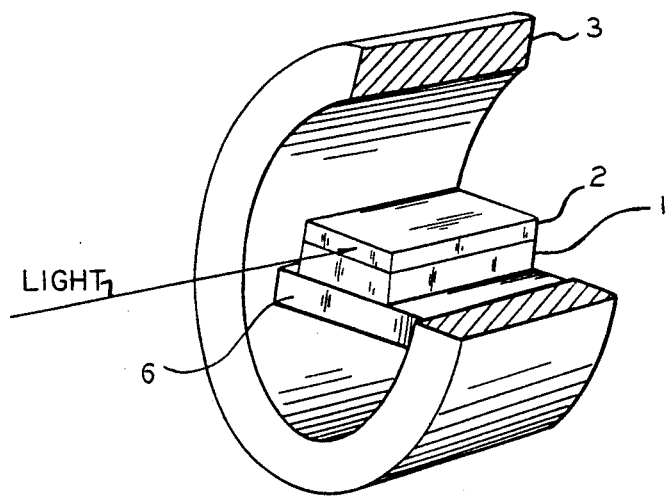
FIG. 1 is a partially sectioned perspective view of an embodiment of the present invention.

Referring to FIG. 1, an inventive Faraday rotator comprises a non-magnetic garnet substrate (hereinafter referred to as "substrate") 1; a ferrimagnetic garnet film (referred to as "film") 2 formed on the substrate; and a permanent magnet 3 for inducing a magnetic field in the film 2 to rotate a light-beam impinging upon one end surface of the film 2, the light beam rotation being by 45-degrees-within the film 2.

In a first embodiment of the invention, the film 2 is formed on the substrate 1 by a liquid phase epitaxial (LPE) technique using a flux comprising $PbO$, $B_2O_3$, $Y_2O_3$, $Gd_2O_3$, and $Fe_2O_3$. A glass plate 6 is used to facilitate placing the substrate 1 inside the magnet 3. The lattice constants $a_s$ and $a_f$ of the substrate 1 and the film 2 were selected so that lattice constant mismatching $\Delta a = a_s - a_f$ satisfies $$|\Delta a| \leq 0.001 \text{ Å (angstrom)}.$$

The selection of the lattice constant mismatching $|\Delta a|$ contributes to preventing isolation deterioration caused by changes in a refractive index (birefringence) arising from lattice constant mismatching between the substrate 1 and the film 2. More definitely, tensile strain or compressive strain occurs within the film by the lattice constant mismatching between the substrate 1 and the film 2. The strain consequently causes the difference (birefringence $|\Delta n| = |n_x n_y|$ in a refractive index between the in-plane direction ($n_x$) and the vertical direction ($n_y$) of the film 2. The birefringence adversely affects the rotation of the plane of polarization of the incident light-beam, to deteriorate the isolation. To prevent a lowered isolation, such mismatching should preferably be zero. However, it need not necessarily be zero if the isolation is more than the 25 dB which is suitable for practical purposes.

Figure 2:
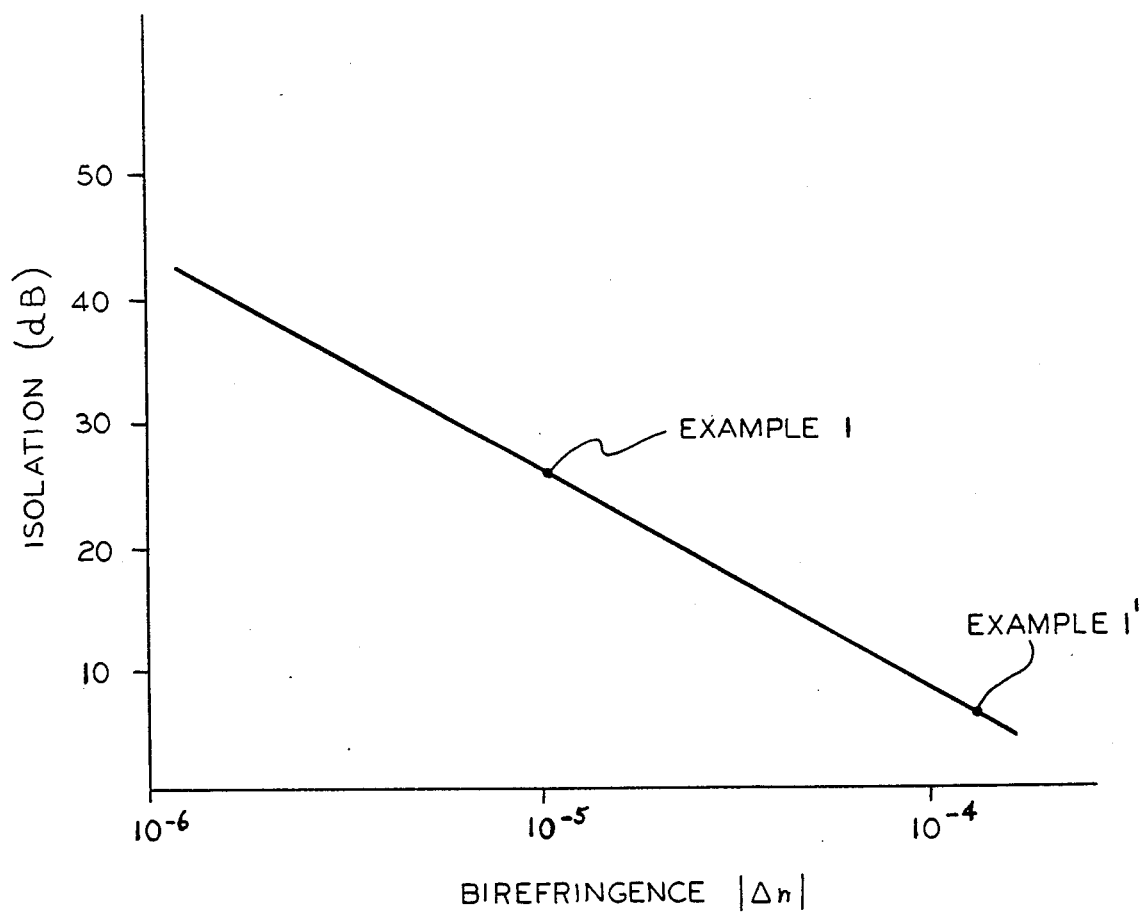
FIG. 2 is a graph showing the relationship between birefringence and isolation.
Figure 3:
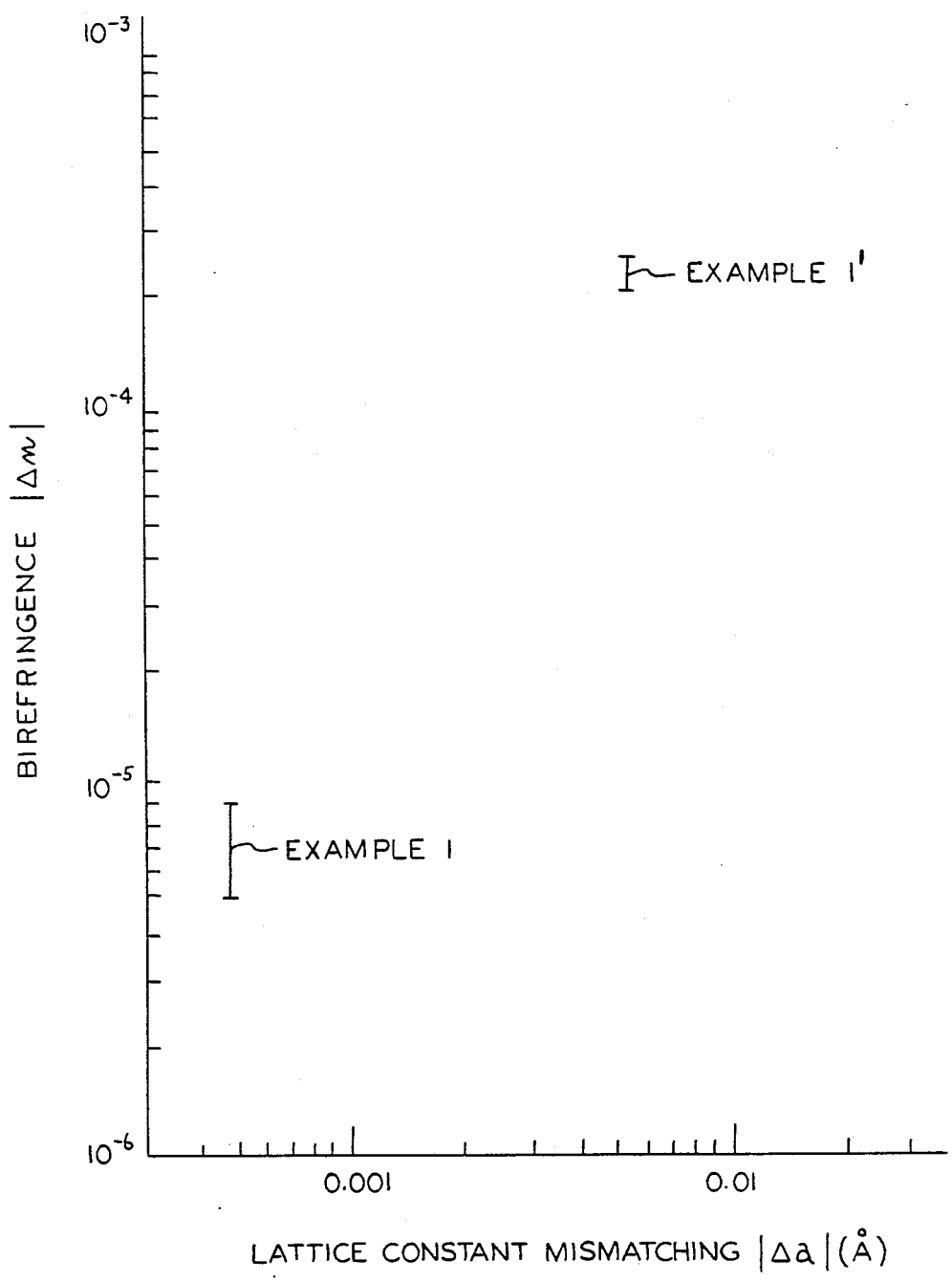
FIG. 3 is a graph showing the relationship between lattice constant mismatching and the birefringence.

The minimum value of the lattice constant mismatching required for obtaining isolation of 25 dB is described by referring to experimental results shown in FIGS. 2 and 3.

From the relationship between the birefringence and isolation shown in FIG. 2, the birefringence $|\Delta n|$ must be below $10^{-5}$ to secure the isolation of more than 25 dB. On the other hand, FIG. 3 shows the relationships between the above-mentioned mismatching and isolation. It is necessary that the mismatching $|\Delta a|$ should be below 0.001 Å to obtain the birefringence of less than $10^{-5}$. Thus, isolation of more than 25 dB is obtained if the mismatching $|\Delta a|$ between the substrate 1 and the film 2 satifies $$|\Delta a| \leq 0.001 \text{ Å}.$$

Example 1, and Example 1', shown in the following Table 1, exhibit the measurement conditions (such as the dimensions of the substrate 1 and the film 2 formed thereon), the diameter of the light-beam and the intensity of a magnetic field for providing the characteristics described in FIGS. 2 and 3 by the use of the structure of FIG. 1.

Examples 1 to 3 shown in Table 1 assume that the lattice constant mismatching is selected to satisfy $|\Delta a| \leq 0.001$ Å for the first embodiment.

In the description given below, a symbol {hkl} denotes a crystallographic plane such as a substrate surface cut out from a crystal, whereas a symbol <hkl> denotes a crystallographic axial direction. An equivalent plane and its axis are also indicated by these symbols. On the other hand, symbols (hkl) and [hkl] denote a specific plane and its axis, respectively.

For each of these examples, an isolation of more than 25 dB was obtained. In Table 1, (111) and (100) planes were selected as the axis for the film growth, but similar effects were obtained with the films grown in either axis. Example 1' shows data obtained when a structure that does not satisfy $|\Delta a| \leq 0.001$ Å was employed, for comparison with the present embodiment.

TABLE 1

| Measurement Condition | | Example 1 | Example 1' | Example 2 | Example 3 |
|---|---|---|---|---|---|
| material of substrate | | $Gd_3Ga_5O_{12}$ | $Gd_3Ga_5O_{12}$ | $Dy_{0.35}Gd_{2.65}Ga_5O_{12}$ | $Gd_3Ga_5O_{12}$ |
| film | material | $Gd_{0.2}Y_{2.8}Fe_5O_{12}$ | $Y_3Fe_5O_{12}$ | $Y_3Fe_5O_{12}$ | $Gd_{0.2}Y_{2.8}Fe_5O_{12}$ |
| | direction of growth | (111) | (111) | (111) | (100) |
| | Faraday rotation coefficient at a wave length 1.3 microns (degree/centimeter) | 188 | 215 | 215 | 188 |
| | length (millimeters) | 2.4 | 2.1 | 2.1 | 2.4 |
| | width (millimeters) | 2.0 | 2.0 | 2.0 | 2.0 |
| | thickness (microns) | 245 | 240 | 240 | 160 |
| | angle of Faraday rotation (degrees) | 45 | 45 | 45 | 45 |
| lattice constant mismatching (angstroms) | | 0.00025 | 0.006 | −0.0004 | −0.0009 |
| birefringence of film | | $3 \times 10^{-6}$ | $9 \times 10^{-3}$ | $0.4 \times 10^{-5}$ | $9.5 \times 10^{-6}$ |
| light- wave length (microns) | | 1.3 | 1.3 | 1.3 | 1.3 |
| beam direction of incidence to film | | parallel to film surface | parallel to film surface | parallel to film surface | parallel to film surface |
| isolation (dB) | | 25 | 7 | 25 | 25 |
| intensity of a magnetic field (oersteds) | | 200 | 200 | 200 | 200 |

It is to be noted that to obtain the optical switch disclosed in Reference 3, the permanent magnet 3 shown in FIG. 1 must be replaced by an electromagnet for the optical path alteration.

In Examples 1 to 3, the lattice constant mismatching between the substrate 1 and the film 2 lowers the isolation. A surface roughness is developed due to a constitutional supercooling in the growth process of the film, to give the second cause for the isolation deterioration. This roughness appears on a, kink plane, such as {111} or {100} plane where the solid-liquid interface is unstable during the film growth process. Since a distribution coefficient of the garnet solute ions is different from that of impurity ions in the surface roughness, the lattice constants are different microscopically at each of the convex and concave portions of the surface roughness, thereby assumedly lowering the isolation.

Meanwhile, no surface roughness appears on the facet planes such as {110} and {211} planes, each of which has a stable solid-liquid interface during the film growth, but projections called hillocks make the film thickness uneven. Therefore, the facet plane is not suitable for the film for a Faraday rotator requiring a uniform film thickness.

Figure 4A:
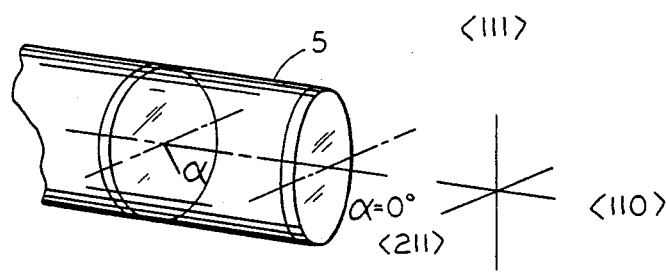
FIGS. 4A, 4B and FIGS. 6A, 6B are diagrams for describing a process for cutting-out a substrate for use in the embodiment.
Figure 4B:
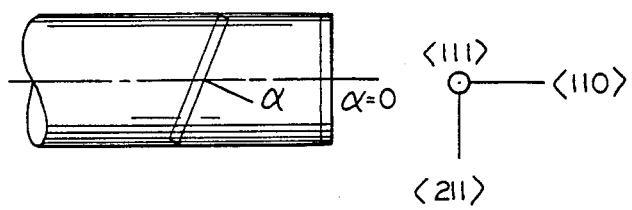

In the second embodiment, a substrate, having a surface inclined by $\alpha°$ (degrees) ($0° < \alpha° \leq 15°$) from the {110} or {211} plane, was used as the substrate 1 of FIG. 1, as shown in FIGS. 4A and 4B, to prevent changes in the lattice constant caused by roughness appearing in the film surface. The use of the plane inclined by $\alpha°$ from the {110} and {211} planes, free from the above-mentioned constitutional supercooling, leads to a film which is free from the surface roughness on the substrate 1.

The angle $\alpha$ is used because, when a {110} plane is inclined toward a {211} plane by $\alpha$, it becomes equal to the {211} plane incline toward the {110} plane by $(30° - \alpha)$.

Examples 4 to 6 of the second embodiment are as follows:

Example 4

Figure 5:
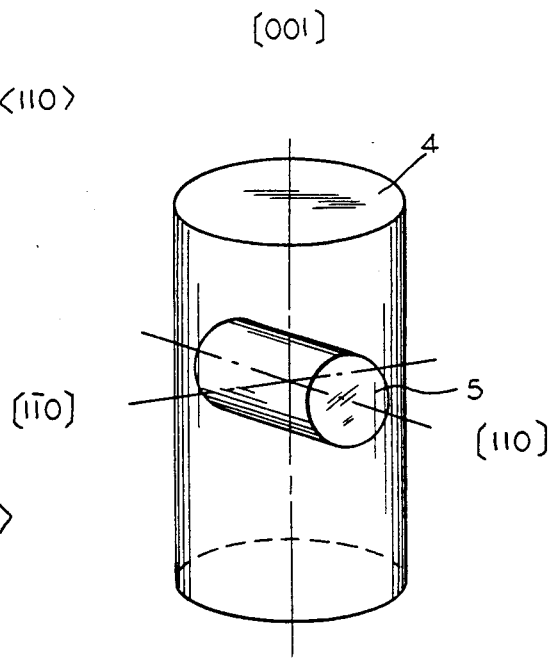
FIG. 5 is a diagram for describing another cutting-out process.
Figure 6A:
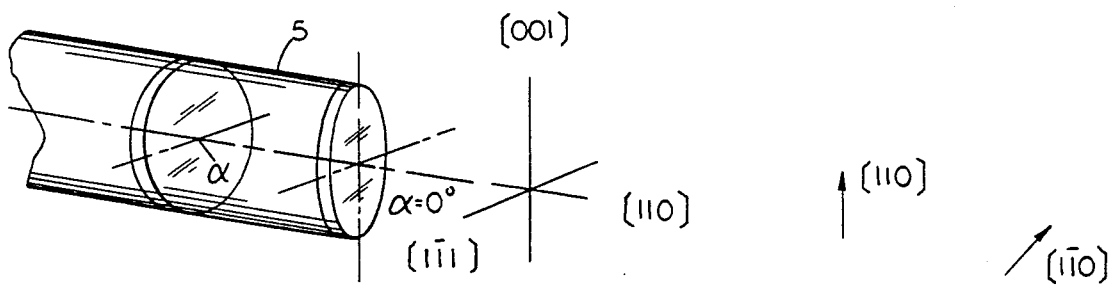
Figure 6B:
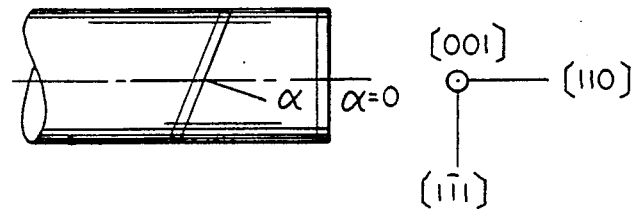

As shown in FIG. 5, a crystal rod 5 is formed parallel to the [110] axis by being cut out from a [001]-grown $Gd_3Ga_5O_{12}$ single crystal boule, with a lattice constant of 12.3832 Å. As shown in FIGS. 6A and 6B, a substrate 1 is sliced from rod 5, with its normal axis inclined by eight degrees with respect to the [110] axis toward a [1$\bar{1}$0] axis, the inclination being within the (110) plane. A garnet film of $Gd_{0.2}Y_{2.8}Fe_5O_{12}$, having a lattice constant of 12.3840 Å was grown on the substrate by the LPE method 1. The isolator employing this rotator exhibited an isolation of 27 dB.

EXAMPLE 5

A crystal rod parallel to the [0$\bar{1}$1] axis was taken from the [111]-grown $Gd_3Ga_5O_{12}$ single crystal boule having a lattice constant of 12.3832 Å. A substrate, with its normal axis inclined by one degree from the [0$\bar{1}$1] axis toward the [$\bar{2}$11] axis (FIG. 4) within the (0$\bar{1}$1) plane, was sliced from the crystal rod. A garnet film of $Gd_{0.2}Y_{2.8}Fe_5O_{12}$, having a lattice constant of 12.3838 Å, was grown on the substrate 1 by the LPE method. The isolator employing this rotator exhibited an isolation of 27 dB.

EXAMPLE 6

A crystal rod parallel to the [$\bar{2}$11] axis was taken from the the single crystal boule of $Gd_3Ga_5O_{12}$ grown along the [111] axis having a lattice constant of 12.3828 Å. A substrate, with its normal axis inclined by 15 degrees from the [$\bar{2}$11] axis toward the [0$\bar{1}$1] axis within the ($\bar{2}$11)

plane, was sliced out from the crystal rod. A garnet film of $Gd_{0.2}Y_{2.8}Fe_5O_{12}$ having the lattice constant of 12.3832 Å was grown on the substrate 1 by the LPE method. The isolator employing this rotator exhibited an isolation of 28 dB.

Figure 7:
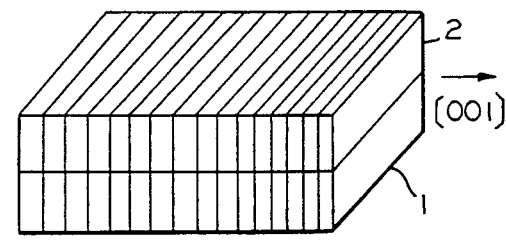
FIG. 7 is a diagram for describing an incident light-beam to be applied to a film grown on the substrate.

Table 2 shows the dimensions of the substrate and the film, the material properties and the measurement conditions for Examples 4 to 6.

vertical to the [001] axis, was cut out from the boule 4. As shown in FIGS. 6A and 6B, a substrate slice was cut normal with its axis inclined by three degrees from the [110] axis toward a [1$\bar{1}$1] axis within the (110) plane. The substrate 1 has parallel growth striation as shown in FIG. 7. A garnet film 2 of $Tb_{0.2}Y_{2.8}Fe_5O_{12}$, taking lattice constant mismatching of 0.0005 Å between the substrate and the film, was grown on the substrate 1

TABLE 2

| Measurement Condition | | Example 4 | Example 5 | Example 6 |
|---|---|---|---|---|
| material of substrate | | $Gd_3Ga_5O_{12}$ | $Gd_3Ga_5O_{12}$ | $Gd_3Ga_5O_{12}$ |
| film | material | $Gd_{0.2}Y_{2.8}Fe_5O_{12}$ | $Gd_{0.2}Y_{2.8}Fe_5O_{12}$ | $Gd_{0.2}Y_{2.8}Fe_5O_{12}$ |
| | Faraday rotation coefficient at a wave length 1.3 microns (degree/centimeter) | 188 | 188 | 188 |
| | length (millimeters) | 2.4 | 2.4 | 2.4 |
| | width (millimeters) | 2.0 | 2.0 | 2.0 |
| | thickness (microns) | 190 | 130 | 140 |
| | angle of Faraday rotation (degrees) | 45 | 45 | 45 |
| lattice constant mismatching (angstroms) | | 0.0008 | −0.0006 | −0.0004 |
| birefringence of film | | $9 \times 10^{-6}$ | $6 \times 10^{-6}$ | $5 \times 10^{-6}$ |
| light- wave length (microns) | | 1.3 | 1.3 | 1.3 |
| beam direction of incidence to film | | parallel to film surface | parallel to film surface | parallel to film surface |
| isolation (dB) | | 27 | 28 | 28 |
| intensity of a magnetic field (oersteds) | | 200 | 200 | 200 |

The third cause for the isolation deterioration is an inappropriate incidence of the light-beam to the film. Growth striation is produced in a single crystal boule by melt convection and fluctuation in power supplied to the melt during a crystal pulling-up process. In the vicinity of such growth striation, the segregation of composition takes place to cause a change in the lattice constant mismatching in the crystal. Further, the growth striation is followed by growing a film on a substrate cut from such a crystal. This means that birefringence, due to the lattice constant mismatching exists in the film. Therefore, when the light-beam incident, to the film parallels the growth striation, the light-beam polarization rotation is affected by the birefringence to cause an isolation deterioration.

In the third embodiment, a lowered isolation is improved by an incidence of a light-beam perpendicular to a growth striation (parallel to the axis of substrate crystal growth).

Examples of the third embodiment are described hereunder.

EXAMPLE 7

As shown in FIG. 5, a $Gd_3Ga_5O_{12}$ single crystal boule 4 was grown along a [001] axis by the well-known Czochralski method, and a rod 5 having a [110] axis, (See FIG. 7). When the light-beam incident to the film was applied parallel to the growth axis [001] of the single crystal, from which the substrate 1 was sliced out, an isolation of 29 dB was obtained.

EXAMPLE 8

A rod 5 (FIGS. 4–6) having the axis [0$\bar{1}$1] which is vertical to a [111] axis was cut out from a non-magnetic $Gd_3Ga_3O_{12}$ single crystal boule 4, which was pulled up along the [111] axis by the Czochralski method. The substrate 1, whose normal axis was inclined by one degree toward the [$\bar{2}$11] axis within the (0$\bar{1}$1) plane, was sliced from the rod 5. The substrate showed the parallel growth striation on the substrate surface, similar to the substrate shown in FIG. 7. On the substrate 1, an LPE $Gd_{0.2}Y_{2.8}Fe_5O_{12}$ garnet film was formed, with a 180-micron thickness, to have the lattice constant of 0.0004 Å. When the light-beam impinged upon to the film 2 with the axis parallel to the growth axis [111] of the single crystal, from which the substrate 1 was sliced out, an isolation of 30 dB was obtained.

Examples 7 and 8 of the third embodiment, shown in the following Table 3, exhibit the measurement conditions (such as the dimension of the substrate 1 and the film formed thereon), the diameter of the light-beam, and the intensity of a magnetic field.

TABLE 3

| Measurement Condition | | Example 7 | Example 8 |
|---|---|---|---|
| material of substrate | | $Gd_3Ga_5O_{12}$ | $Gd_3Ga_5O_{12}$ |
| film | material | $Tb_{0.2}Y_{2.8}Fe_5O_{12}$ | $Gd_{0.2}Y_{2.8}Fe_5O_{12}$ |
| | Faraday rotation coefficient at a wave length 1.3 microns (degree/centimeter) | 217 | 188 |
| | length (millimeters) | 2.1 | 2.4 |
| | width (millimeters) | 2.0 | 2.0 |
| | thickness (microns) | 140 | 160 |
| | angle of Faraday rotation (degrees) | 45 | 45 |
| lattice constant mismatching (angstroms) | | 0.0005 | 0.0004 |
| birefringence of film | | $6 \times 10^{-6}$ | $5 \times 10^{-6}$ |
| light- wave length (microns) | | 1.3 | 1.3 |

TABLE 3-continued

| Measurement Condition | Example 7 | Example 8 |
|---|---|---|
| beam direction of incidence to film | parallel to film surface | parallel to film surface |
| isolation (dB) | 29 | 30 |
| intensity of a magnetic field (oersteds) | 200 | 200 |

As shown in Tables 1 to 3, each of Examples 1 to 8 shows data for a structure having a substrate of $Gd_3Ga_5O_{12}$ and a film of either $Gd_{0.2}Y_{2.8}Fe_5O_{12}$ or $Tb_{0.2}Y_{2.8}Fe_5O_{12}$, which satisfies lattice constant mismatching of $|\Delta a| \leq 0.001$ Å. In the case of the substrate of $Gd_3Ga_5O_{12}$, the film may be eventually composed of $Gd_xY_{3-x}Fe_5O_{12}$ or $Tb_xY_{3-x}Fe_5O_{12}$, where X ranges from 0.18 to 0.24. On the other hand, in Example 2 where the substrate of $Y_3Fe_5O_{12}$ and the film of $Dy_{0.35}Gd_{2.65}Ga_5O_{12}$ were used as the materials satisfying the lattice constant mismatching of $|\Delta a| \leq 0.001$ Å, the film may be composed of $Dy_xGd_{3-x}Ga_5O_{12}$, where X ranges from 0.32 to 0.37.

As discussed hereinabove, the present invention can achieve a less expensive Faraday rotator with a higher degree of isolation.

What is claimed is:

1. A Faraday rotator comprising: a non-magnetic garnet substrate; a ferrimagnetic garnet film epitaxially grown on the substrate; a light beam impinging upon a surface at an end of said film; and a magnet for inducing a magnetic field parallel to the top surface of said film for rotating a plane of polarization within said film of said light-beam impinging upon said film, said substrate and said film being made of a material having a predetermined absolute value of the difference $\Delta a = a_s - a_f$ between the lattice constant $a_s$ of said substrate and the lattice constant $a_f$ of said film, said predetermined absolute value being no greater than 0.001 Å (angstrom).

2. A Faraday rotator as claimed in claim 1 wherein said substrate, comprises $Gd_3Ga_5O_{12}$ and said film consists of $Gd_xY_{3-x}Fe_5O_{12}$, where x ranges from 0.18 to 0.24.

3. A Faraday rotator as claimed in claim 1 wherein said substrate comprises $Gd_3Ga_5O_{12}$ and said film comprises $Tb_xY_{3-x}Fe_5O_{12}$, where x ranges from 0.18 to 0.24.

4. A Faraday rotator as claimed in claim 1 wherein said substrate comprises $Dy_xGd_{3-x}Ga_5O_{12}$ and said film comprises $Y_3Fe_5O_{12}$, where x ranges from 0.32 to 0.37.

5. A Faraday rotator as claimed in claim 1 wherein said substrate 1 is from a single crystal boule having a predetermined growth axis, said substrate having its normal inclined from a <110> axis toward a predetermined axis by an angle $\alpha°$ which is greater than 0 degrees but no greater than 15 degrees.

6. A Faraday rotator as claimed in claim 1 wherein said substrate is from a single crystal boule having a predetermined growth axis, said substrate having its normal inclined from a <211> axis toward a predetermined axis by an angle of $\alpha°$ which is greater than 0 degree but no greater than 15 degrees.

7. A Faraday rotator as claimed in claim 1 wherein said substrate has a growth striation, and the light-beam impinging upon one end surface of said film travels vertically to said growth striation.

8. A Faraday rotator as claimed in claim 1 wherein said substrate is from a non-magnetic garnet single crystal having a <111> growth axis, said substrate having its normal inclined from a <110> axis toward a <211> axis within a {110} plane by an angle $\alpha°$ which is greater than 0 degree but no greater than 15 degrees.

9. A Faraday rotator as claimed in claim 1 wherein said substrate is from a non-magnetic garnet single crystal having a <111> growth axis, said substrate having its normal inclined from a <211> axis toward a <110> axis within a {211} plane by an angle of $\alpha°$ which is greater than 0 degree but no greater than 15 degrees.

10. The Faraday rotator of claim 1 wherein said substrate is taken from the group consisting of $Gd_3Ga_5O_{12}$ and $Dy_xGd_{3-x}Ga_5O_{12}$, where x ranges from 0.032 to 0.37.

11. The Faraday rotator of claim 1 wherein said film is taken from the group consisting of $Y_3Fe_5O_{12}$, $Gd_xY_{3-x}Fe_5O_{12}$, and $Tb_xY_{3-x}Fe_5O_{12}$, where x ranges from 0.18 to 0.24.

* * * * *